(12) United States Patent
Harreither et al.

(10) Patent No.: US 9,296,184 B2
(45) Date of Patent: Mar. 29, 2016

(54) METHOD FOR BUTT-WELDING TWO STRIPS ALONG THE LONGITUDINAL EDGES THEREOF

(75) Inventors: Rupert Harreither, Oberaich (AT); Roland Schuster, Berndorf (AT)

(73) Assignee: Berndorf Band GmbH, Berndorf (AT)

( * ) Notice: Subject to any disclaimer, the term of this patent is extended or adjusted under 35 U.S.C. 154(b) by 202 days.

(21) Appl. No.: 14/113,883

(22) PCT Filed: Apr. 26, 2012

(86) PCT No.: PCT/AT2012/050055
§ 371 (c)(1),
(2), (4) Date: Oct. 25, 2013

(87) PCT Pub. No.: WO2012/145779
PCT Pub. Date: Nov. 1, 2012

(65) Prior Publication Data
US 2014/0041784 A1 Feb. 13, 2014

(30) Foreign Application Priority Data
Apr. 27, 2011 (AT) .................... A 590/2011

(51) Int. Cl.
*B32B 37/00* (2006.01)
*B23K 9/00* (2006.01)
(Continued)

(52) U.S. Cl.
CPC ........... *B32B 37/0046* (2013.01); *B23K 9/0035* (2013.01); *B23K 9/0209* (2013.01);
(Continued)

(58) Field of Classification Search
CPC ............... B23K 9/0035; B23K 9/0209; B23K 26/0838; B23K 26/244; B23K 9/025; B23K 26/26; B23K 2201/16; B29C 66/1142; B29C 66/435; B29C 65/16; B29C 65/1667; B29C 65/7802; B29C 65/7894; B29C 66/71; B29L 2031/3475; B29L 2001/12; B32B 37/0046; B32B 37/06; Y10T 156/17; Y10T 156/10; B29K 2001/12
USPC ......................................... 156/60, 538, 379.8
See application file for complete search history.

(56) References Cited

U.S. PATENT DOCUMENTS 3,615,994 A 10/1971 MacLaine et al.
3,728,066 A 4/1973 Stadler et al.
(Continued)

FOREIGN PATENT DOCUMENTS

CN 101357427 A 2/2009
DE 20 42 130 A1 3/1971
(Continued)

OTHER PUBLICATIONS

International Search Report of PCT/AT2012/050055, mailed Oct. 17, 2012.
Miao et al., Analysis of characteristic of vertical position laser welding for aluminum alloys, State Key Laboratory of Advanced Welding Production Technology, Harbin Institute of Technology, 2007 vol. 28, No. 10, Harbin 150001. China, pp. 57-60.

*Primary Examiner* — Jacob T Minskey
*Assistant Examiner* — Vishal I Patel
(74) *Attorney, Agent, or Firm* — Collard & Roe, P.C.

(57) ABSTRACT

Disclosed are a method and a device for producing a strip (7) obtained by longitudinally welding together at least two individual strips (2, 3), characterized in that sections of the individual strips are deflected in a vertical direction (III) before being welded together, and the deflected sections of the strips (2, 3) are guided past a welding head of a welding apparatus (6) in the vertical direction (III) and are welded together by the welding head.

7 Claims, 1 Drawing Sheet

(51) Int. Cl.
  *B23K 9/02*      (2006.01)
  *B23K 26/08*     (2014.01)
  *B29C 65/00*     (2006.01)
  *B29C 65/78*     (2006.01)
  *B32B 37/06*     (2006.01)
  *B29C 65/16*     (2006.01)
  *B29L 31/34*     (2006.01)

(52) U.S. Cl.
  CPC ......... *B23K26/0838* (2013.01); *B29C 65/7802* (2013.01); *B29C 65/7894* (2013.01); *B29C 66/1142* (2013.01); *B29C 66/435* (2013.01); *B32B 37/06* (2013.01); *B29C 65/16* (2013.01); *B29C 65/1667* (2013.01); *B29C 66/71* (2013.01); *B29L 2031/3475* (2013.01); *Y10T 156/10* (2015.01); *Y10T 156/17* (2015.01)

(56) References Cited

U.S. PATENT DOCUMENTS

| | | | | |
|---|---|---|---|---|
| 3,752,724 | A | * | 8/1973 | Seiler ............................ 156/351 |
| 5,187,346 | A | * | 2/1993 | Bilge ..................... B23K 26/32 |
| | | | | 219/121.64 |
| 5,228,936 | A | * | 7/1993 | Goodhue ....................... 156/260 |
| 2006/0151291 | A1 | * | 7/2006 | Kai ................... B23K 26/0846 |
| | | | | 198/415 |

FOREIGN PATENT DOCUMENTS

| | | |
|---|---|---|
| DE | 40 22 062 C1 | 11/1991 |
| DE | 691 07 466 T2 | 6/1995 |
| EP | 0 438 612 A1 | 7/1991 |
| JP | 2001269785 A | 2/2001 |

\* cited by examiner

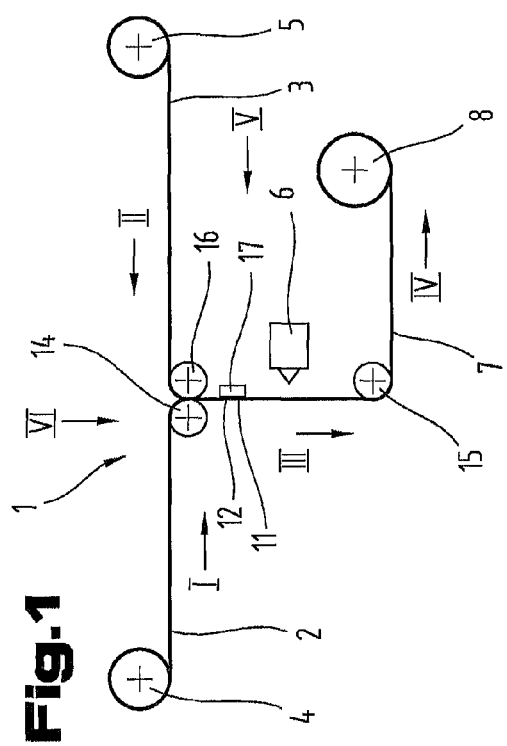
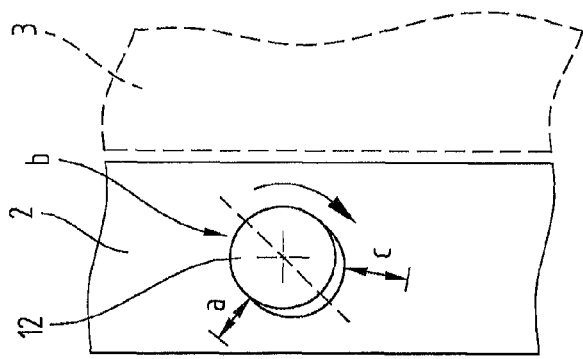
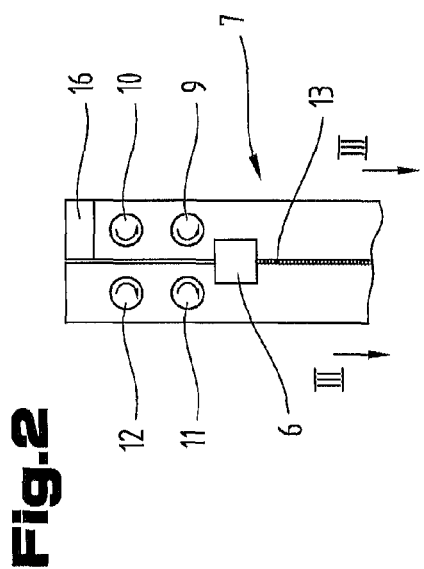
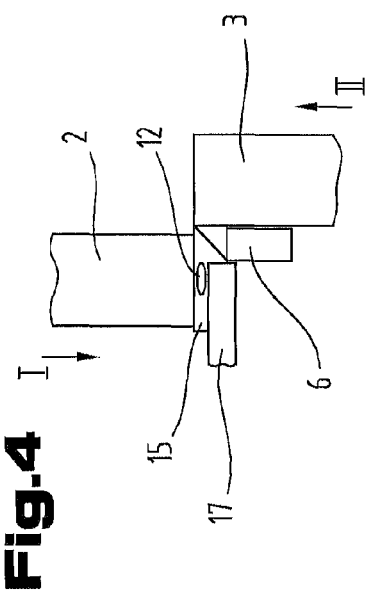

METHOD FOR BUTT-WELDING TWO STRIPS ALONG THE LONGITUDINAL EDGES THEREOF

CROSS REFERENCE TO RELATED APPLICATIONS

This application is the National Stage of PCT/AT2012/050055 filed on Apr. 26, 2012, which claims priority under 35 U.S.C. §119 of Austrian Application No. A 590/2011 filed on Apr. 27, 2011, the disclosures of which are incorporated by reference. The international application under PCT article 21(2) was not published in English.

The invention relates to a method for producing a strip which is produced by welding together the longitudinal sides of at least two individual strips.

Furthermore, the invention relates to a device for producing a longitudinally welded strip consisting of at least two individual strips by means of a welding device and at least one drive means for moving the strips.

The invention also relates to a strip produced by welding individual strips.

In the production of films, in particular triacetate films, which are used for example for producing LCD screens, continuous strips are used onto which such films are applied. The production of larger screens makes it necessary to use wider continuous strips. It is also an advantage with respect to increasing the productivity of the production of film material to use wider strips. As the strip widths of the raw strips used for the production of continuous strips is usually about 2 m, to achieve wider strip widths two or more raw strips are welded together along their longitudinal edges. This longitudinal welding is normally performed in a horizontal plane. For this according to the prior art the raw strips wound onto rollers are unwound next to one another and welded together in the longitudinal direction of the strips along their longitudinal edges. The welding seam is guided here in horizontal direction. A method of this kind or a strip of this kind is known for example from U.S. Pat. No. 3,728,066. The disadvantage of the known method however is that because of the horizontal orientation of the strips and the guiding of the welding seam during welding the resulting welding seam is asymmetrical because of the effect of gravity. This is mainly a problem because the surface of the longitudinally welded strip has to be as homogenous as possible for the production of film and should not comprise any irregularities. If the welding seam is asymmetrical the surface of the strip may lack homogeneity in subsequent processing steps, such as for example grinding, because of the uneven removal of material.

Therefore, the objective of the invention is to enable the production of wide strips from individual strips with optimum surface properties.

This objective is achieved according to the invention by means of a method of the aforementioned kind in that sections of the individual strips are deflected prior to welding into a vertical direction, wherein the deflected sections of the strips are guided in vertical direction past a welding head of at least one welding device and are welded together by the latter.

It should be noted at this point that in this document the term vertical means substantially perpendicular to the earth's surface or to the center of the earth. Thus the term vertical is used in the present context to mean "substantially perpendicular". However, it should also be noted that slight deviations from the perpendicular which do not affect the solution according to the invention are of course also covered by the term "vertical".

By means of the vertical arrangement of the welding seam any melt which is produced during the welding process is distributed evenly as a result of gravity and thus a symmetrical welding seam is obtained. Owing to the symmetry of the welding seam a more even removal of material during a subsequent grinding process is also ensured. In this way in addition to simplifying the processing also the surface quality of a continuous strip formed by the longitudinally welded strip is improved considerably.

According to an advantageous development of the invention the facing edges to be welded together of the sections of the strips deflected in vertical direction are driven towards one another by means of rotary discs, wherein at least one rotary disc is assigned to each strip said rotary disc being inclined in the direction of the other strip. In this way a gap between the strips to be welded together can be reduced in the region of the welding point and this has a favorable effect on the welding process. In this case it has proved to be particularly advantageous if each rotary disc only bears in a section adjacent to the longitudinal edge to be welded on the surface of the strip assigned thereto.

According to a particularly advantageous variant of the invention it possible that the individual strips to be welded together are guided towards one another from opposite conveying directions prior to being deflected in vertical direction. This embodiment of the invention ensures the optimum running of the strip of the two individual strips. By means of this arrangement also any disruption caused by the movements of the strips is prevented during the horizontal conveying to the welding point, which may occur in a parallel arrangement of the strips during the conveying to the welding point or to a deflection in vertical direction arranged ahead of the welding point.

The said objective can also be achieved by means of a device of the aforementioned kind in that the latter comprises at least one deflection device, by means of which the individual strips are deflected in vertical direction prior to passing the welding head of the welding device and are guided in vertical direction and in a common plane past the welding head of the welding device.

According to an advantageous development of the device according to the invention the conveying directions of the individual strips to be welded together are opposite one another prior to passing the at least one deflection device.

In a preferred variant of the invention the device comprises between the at least one deflection device and the welding head of the welding device at least two rotary discs, which are inclined relative to the surfaces of individual strips in the direction of the longitudinal edges of said strips to be welded together. It is particularly advantageous in this case if the rotary discs are arranged to be freely rotatable about their axes of rotation.

In a particularly advantageous development of the invention the welding device is a laser welding device. Although the solution according to the invention is not restricted to the use of a laser welding device, and other welding methods can also be used such as for example WIG welding, MIG/MAG welding, ultrasound or friction stir welding, the use of a laser welding device has the advantage of forming a narrow and thin welding seam. This is particularly advantageous in the present context.

A strip produced by the method according the invention or with the device according to the invention has the advantage of having a large width and a symmetrical welding seam. A strip of this kind can be processed further particularly well to form a high-gloss polished continuous strip with a very homogenous structure and surface properties.

The invention with the further advantages is explained in more detail in the following with reference to several exemplary embodiments which are not restrictive and which are represented in the Figures.

In a much simplified schematic representation:

FIG. 1 shows a side view of a device according to the invention;

FIG. 2 shows a view of a welding area from direction V in FIG. 1, in which a holder for rotary discs is not shown;

FIG. 3 shows in more detail a rotary disc which is arranged in a vertical strip running section and cooperates with a strip;

FIG. 4 shows a plan view of a section of the device in FIG. 1 from direction VI.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

According to FIG. 1 a device according to the invention for welding two individual strips 2, 3 comprises a welding device 6, which is preferably in the form of a laser welding device. Although only one welding device 6 is shown here, the strips 2 and 3 can also be welded from both sides. In this case two or even more welding devices can be provided. The welding devices can be arranged here on opposite broad sides of the strips 2 and 3 and if necessary can also weld together the two strips 2 and 3 simultaneously. By arranging the welding devices on both sides an even more symmetrical welding seam can be obtained. The strips 2 and 3 in the embodiment shown here can be unwound from rollers 4 and 5. The rollers 4 and 5 can each be driven by means of a drive means, for example an axially arranged motor for moving the strips 2 and 3 in their conveying directions I and II. Furthermore, the strips 2 and 3 can also be drawn in their conveying directions I and II. For this a driven roller 8 can be provided, onto which a strip 7 welded together from the two strips 2 and 3 by means of the welding device 6 is wound.

For deflecting the strips 2 and 3 in vertical direction III the device 1 comprises deflecting devices 14 and 16. The deflecting devices 14, 16 can be configured for example as deflecting rollers.

According to the method of the invention for producing the strip 7 by welding the longitudinal sides of the individual strips 2, 3 sections of the individual strips 2, 3 are deflected prior to welding from their conveying directions I and II into a vertical direction III. The deflected sections of the strips 2, 3 are guided in vertical direction III past a welding head of the welding device 6 and welded together by the latter. In this connection it should be mentioned that the facing longitudinal edges of the two strips 2 and 3 are welded together so that a surface-flush strip 7 is formed which is held together by a welding seam 13. Owing to the vertical arrangement of the strips 2 and 3 in the welding area melted material can harden symmetrically. The resulting welding seam 13 is characterized by having a very symmetrical form.

As shown in FIGS. 1 and 4 the two strips 2 and 3 are preferably moved towards one another prior to their deflection by means of the deflecting devices 14 or 16 from opposite conveying directions I and II. After deflecting in vertical direction the two strips 2 and 3 are in a common plane, where the directions of movement of the two strips 2 and 3 are parallel to one another after deflection. As also shown in FIG. 4, the two strips 2 and 3 are laterally offset relative to one another so that they are arranged immediately adjacent to one another after deflection.

After welding the strips 2 and 3 to form the strip 7 an additional deflection device 15 can be provided, for example also in the form of a roller which guides the strip 7 on to the roller 8.

In the region of the welding point the device 1 can comprise rotary discs which are denoted in FIG. 2 by the reference numerals 9, 10, 11, 12. In FIG. 1 however only two rotary discs 11 and 12 are shown. The rotary discs 9, 10, 11, 12 can be secured onto a holder 17 so as to be freely rotatable about their axes of rotation, which holder can be arranged for example on a not shown machine frame. In the view in FIG. 2 the holder 17 is not shown in order to illustrate the functioning of the rotary disc more clearly.

Unlike the variant of the invention shown in FIG. 2 for each strip 2 and 3 also at least two opposite rotary discs can be provided. This means that on each of the two opposite sides of the strip 2 or 3 at least one rotary disc can be arranged, wherein said rotary discs are preferably arranged to be exactly opposite one another.

The facing edges to be welded together of the sections of the strips 2, 3 deflected in vertical direction are driven towards one another by means of the rotary discs 9, 10, 11, 12. The rotary discs 9, 10, 11, 12 in contact with a strip 2, 3 can here be inclined in the direction of the other strip 2, 3. This means that the axes of rotation of the rotary discs 9, 10, 11, 12 are inclined in the direction of the gap between the two strips 2 and 3. It is particularly advantageous if each rotary disc 9, 10, 11, 12 only bears in a section b adjacent to the longitudinal edge to be welded on the surface of the strip 2, 3 assigned thereto, as shown in FIG. 3. According to the view in FIG. 3 the rotary disc 12 is spaced apart at its sections furthest from the longitudinal edge of the strip 2 to be welded from the strip surface. Said distances are denoted in FIG. 3 by the reference numerals a and c.

The rotary discs 9, 10, 11 and 12 are driven by means of a downwards movement of the two strips 2 and 3. By means of the resulting rotational movement of the rotary discs 9, 10, 11 and 12 the two strips 2 and 3 are driven towards one another and a gap between the longitudinal edges of the two strips 2 and 3 to be welded together is reduced, whereby an optimum distance can be achieved between the strips 2 and 3 for the welding process.

The longitudinally welded strip 7 can be subjected to subsequent processing steps, such as for example grinding and/or polishing.

The exemplary embodiments show possible embodiment variants of the method according to the invention and the device according to the invention, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Thus all conceivable embodiment variants, which are made possible by combining individual details of the embodiment variants shown and described, are also covered by the scope of protection.

Finally, as a point of formality, it should be noted that for a better understanding of the structure of the device according the invention the latter and its components have not been represented true to scale in part and/or have been enlarged and/or reduced in size.

LIST OF REFERENCE NUMERALS

1 Device
2 Strip
3 Strip
4 Roller
5 Roller
6 Welding device
7 Strip
8 Roller
9 Rotary disc
10 Rotary disc
11 Rotary disc
12 Rotary disc
13 Welding seam
14 Deflecting roller
15 Deflecting roller
16 Deflecting roller
17 Holder

The invention claimed is:

1. A method for producing a strip, which is produced by welding together the longitudinal sides of at least two individual strips, wherein sections of the individual strips are deflected prior to welding in a vertical direction, wherein the deflected sections of the strips are guided in the vertical direction past a welding head of at least one welding device and are welded together by the welding head,
wherein after being deflected in the vertical direction the two strips are in a common plane,
wherein the facing longitudinal edges to be welded together of sections of the strips deflected in the vertical direction are driven towards one another via rotary discs,
wherein at least one rotary disc is assigned to each strip and is inclined in the direction of the other strip, and
wherein axes of rotation of the rotary discs are inclined in the direction of a gap between the two strips.

2. The method as claimed in claim 1, wherein each rotary disc only bears in a section adjacent to the longitudinal edge to be welded on the surface of the strip assigned thereto.

3. The method as claimed in claim 1, wherein the individual strips to be welded together are guided towards one another prior to deflection in vertical direction from opposite conveying directions.

4. A device for producing a longitudinally welded strip comprising at least two individual strips, the device comprising a welding device and at least one drive for moving the strips, wherein the device comprises at least one deflecting device, wherein the individual strips are deflected in a vertical direction via the at least one deflecting device prior to passing the welding head of the welding device and are guided in the vertical direction in a common plane past the welding head of the welding device,
wherein the device comprises at least two rotary discs between the at least one deflecting device and the welding head, the at least two rotary discs being arranged to be inclined relative to the surfaces of individual strips in the direction of the longitudinal edges of said strips to be welded together, at least one rotary disc being assigned to each strip, and wherein axes of rotation of the rotary discs are inclined in the direction of a gap between the two strips.

5. The device as claimed in claim 4, wherein the conveying directions of the individual strips to be welded together are opposite one another prior to passing through the at least one deflecting device.

6. The device as claimed in claim 4, wherein the rotary discs are arranged to be freely rotatable about their respective axes of rotation.

7. The device as claimed in claim 4, wherein the welding device is a laser welding device.

* * * * *